March 22, 1966    H. HOPE ETAL    3,241,473
MACHINE FOR PROCESSING X-RAY FILM OR THE LIKE
Filed June 27, 1963
7 Sheets-Sheet 2
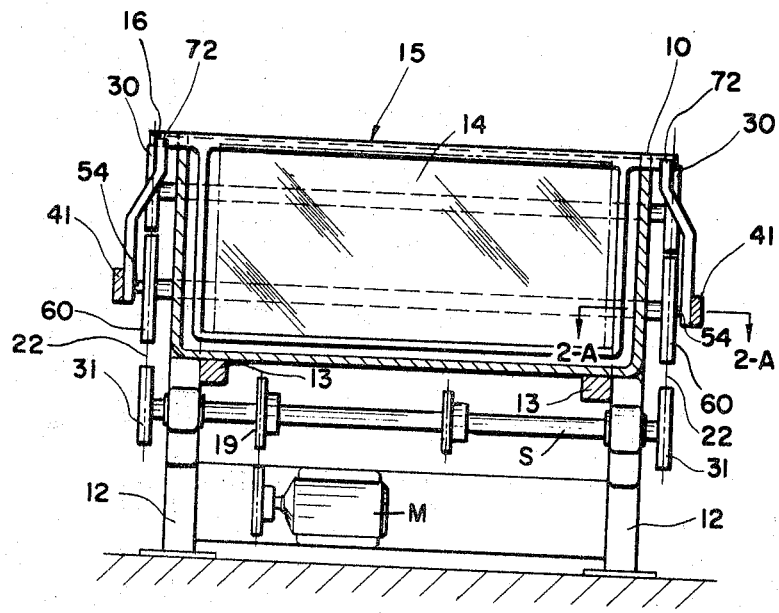
FIG_2_
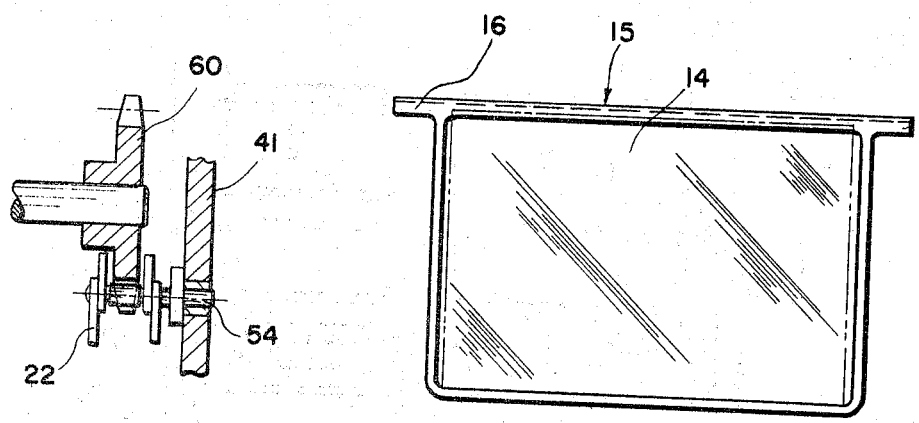
FIG_2-A_    FIG_3_
INVENTORS
HENRY HOPE
GUY STEELE
BY
ATTORNEY

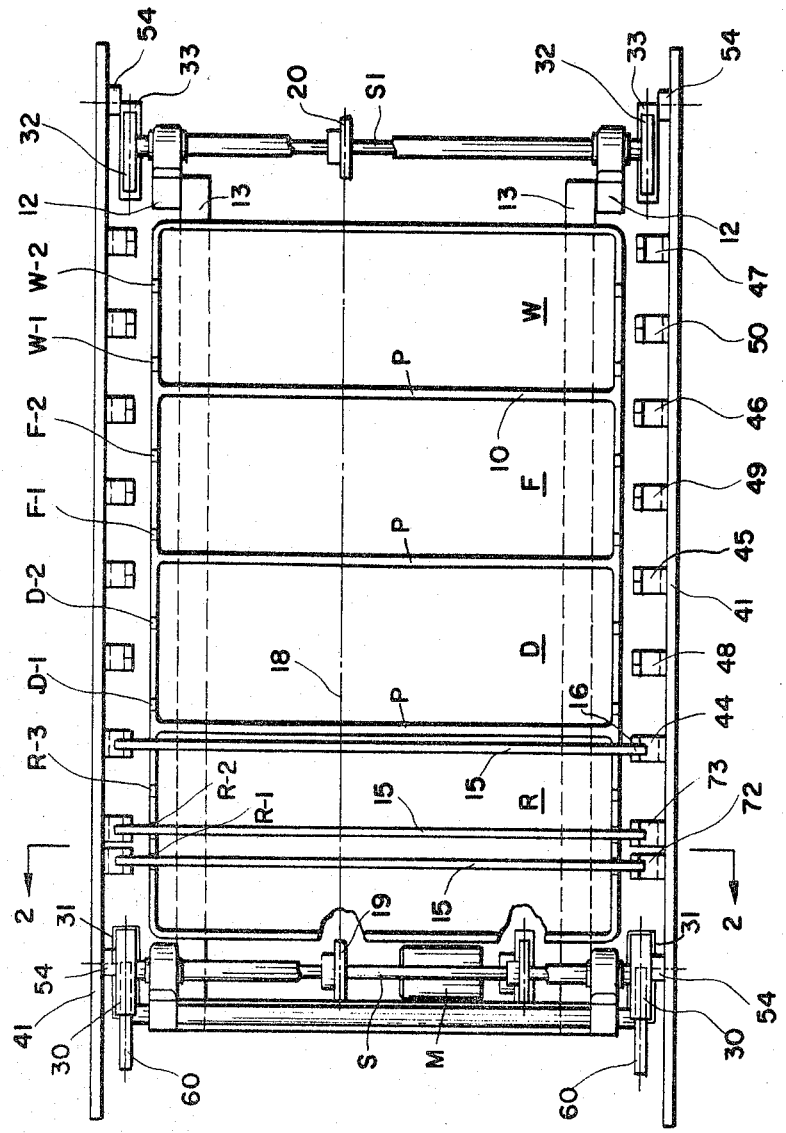

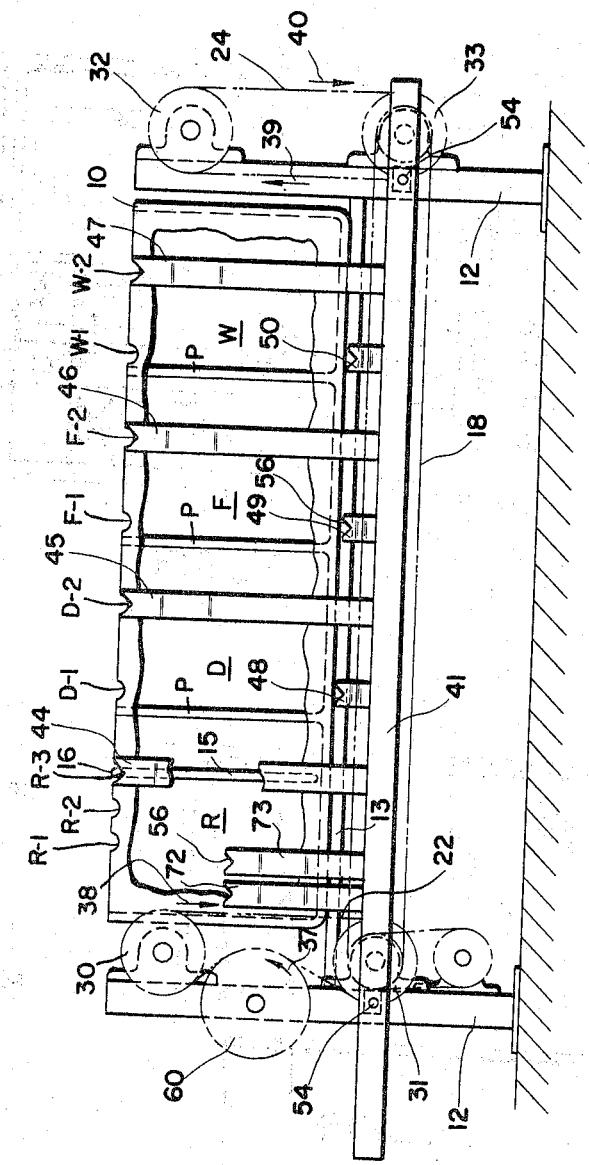

March 22, 1966 H. HOPE ETAL 3,241,473
MACHINE FOR PROCESSING X-RAY FILM OR THE LIKE
Filed June 27, 1963 7 Sheets-Sheet 4
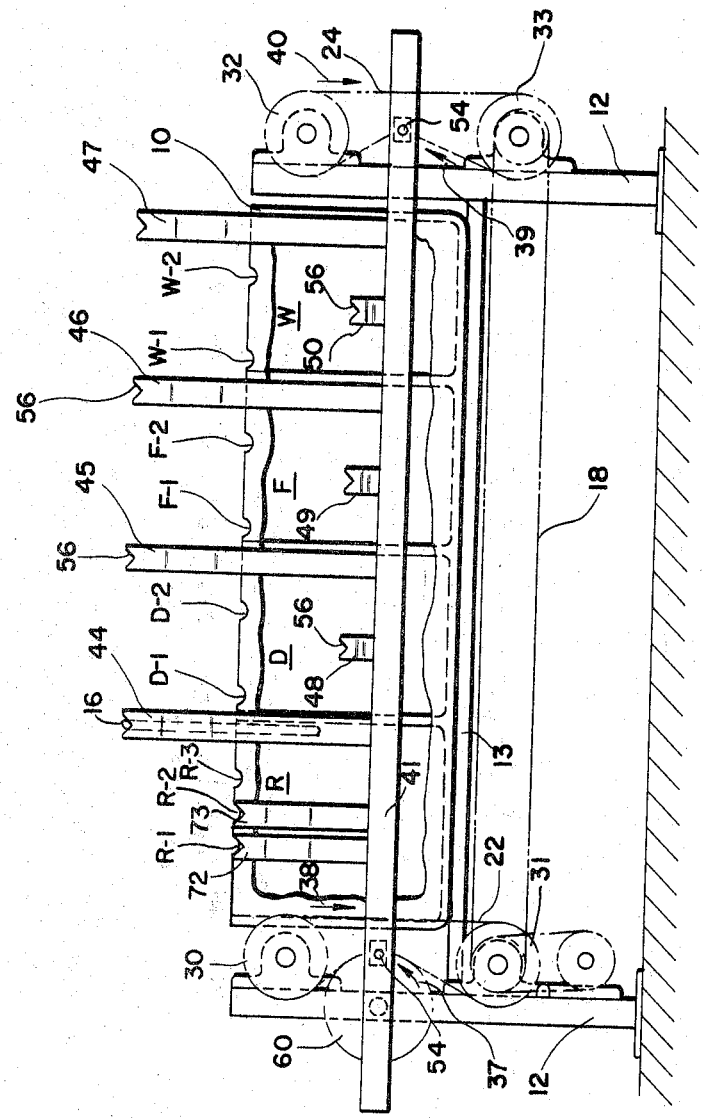
FIG-5-
INVENTORS
HENRY HOPE
GUY STEELE
BY
ATTORNEY

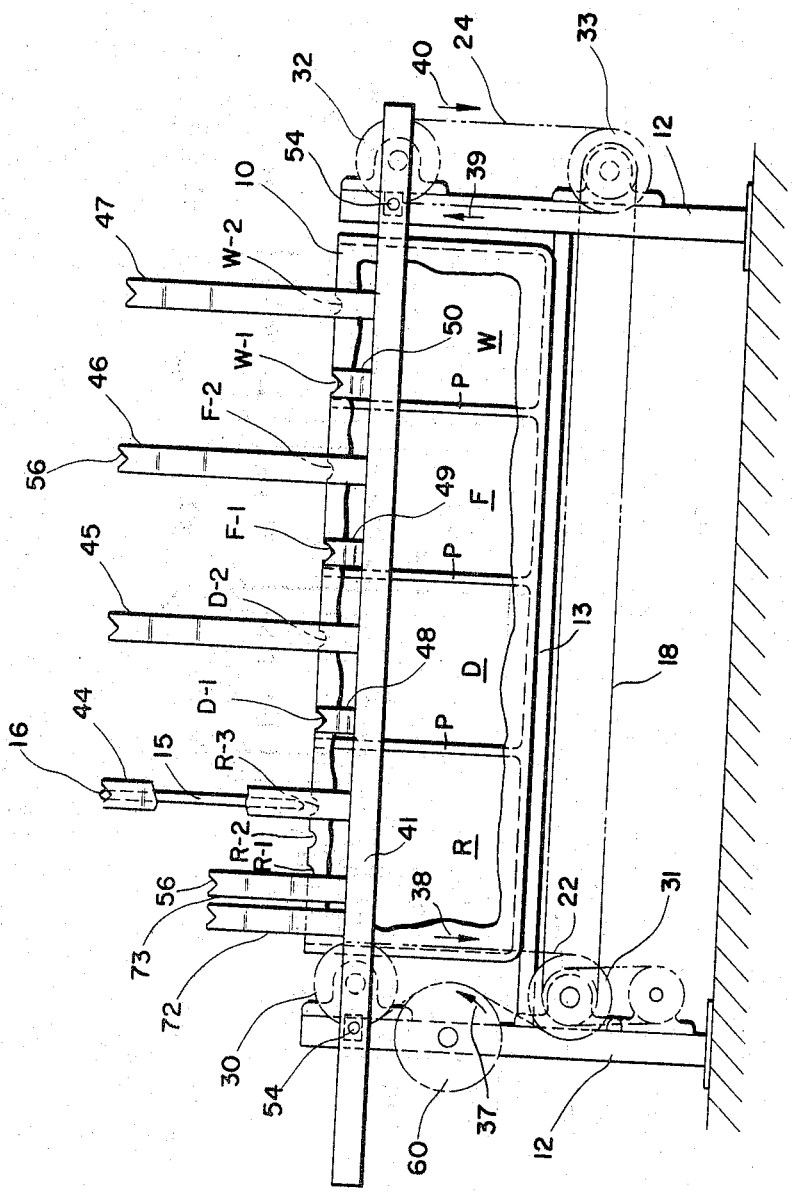

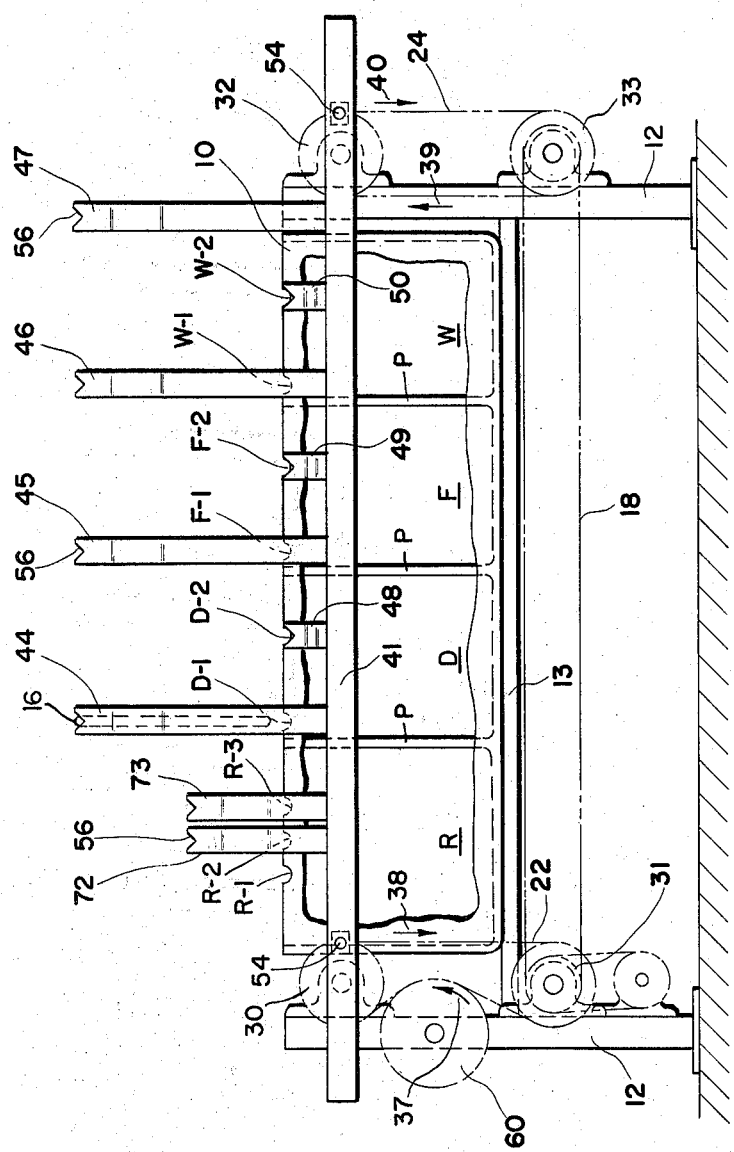

March 22, 1966  H. HOPE ETAL  3,241,473
MACHINE FOR PROCESSING X-RAY FILM OR THE LIKE
Filed June 27, 1963  7 Sheets-Sheet 7
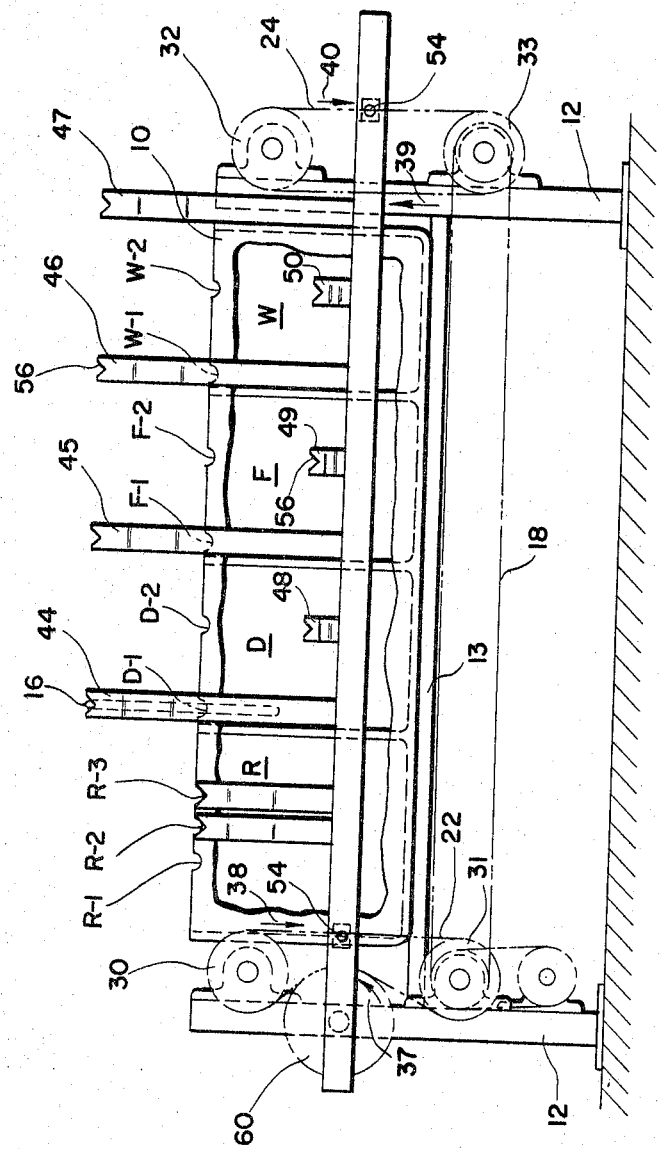
FIG_8_
INVENTORS
HENRY HOPE
GUY STEELE
BY
ATTORNEY

United States Patent Office 3,241,473
Patented Mar. 22, 1966

3,241,473
MACHINE FOR PROCESSING X-RAY FILM
OR THE LIKE
Henry Hope, Huntingdon Valley, and Guy Steele, Chalfont, Pa., assignors to Quadros Corporation, a corporation of Pennsylvania
Filed June 27, 1963, Ser. No. 291,015
6 Claims. (Cl. 95—89)

This invention relates to a machine for processing photographic film.

One object of the invention is to produce improved means of the type set forth.

Machines for processing photographic film are presently available, but all such machines of which we are aware are expensive to make and are designed for automatic operation exclusively. This means that, in the absence of a second automatic, or manually operable machine, the processing operation must stop until repairs are made. This difficulty arises from the fact that the film propelling machinery is disposed above, and within, the processing compartments. For this type of construction reference may be had to Patent No. 1,525,363.

It is therefore a further object of this invention to produce an improved processing machine in which the film propelling machinery is disposed wholly along the outer sides of the processing compartments so as to provide full and unimpeded access to the various compartments. By this arrangement, the machine can be used for manual, or for automatic processing at will.

For human, and for other studies, X-ray films are exposed in batches and it is therefore a still further object of the invention to produce an improved machine which can accept a large number of films simultaneously and which can automatically proceed to develop the films successively.

A still further object is to produce an improved machine wherein the film propelling machinery, and its movement, are greatly simplified.

These and other objects are attained by this invention as set forth in the following specification and as illustrated in the accompanying drawings in which:

FIG. 1 is a top plan view of a machine embodying the invention.

FIG. 2 is a sectional view looking in the direction of line 2—2 on FIG. 1.

FIG. 2–A is an enlarged sectional view looking in the direction of line 2A—2A on FIG. 2.

FIG. 3 is a side elevational view of a typical X-ray film holder carrying a film.

FIG. 4 is a side elevational view of the machine with the proximal side wall broken away to show inside details.

FIGS. 5 to 8, inclusive, are similar to FIG. 4, but showing the positions the various parts assume during a cycle of operation.

As shown in FIGS. 1 and 2, a machine embodying this invention includes a tank 10 of suitable size and material supported on legs 12 which are connected by braces 13. The tank is divided by partitions P to form a film-receiving compartment R; a film-developing compartment D; a film-fixing compartment F; a washing compartment W. Compartments F, D and W are supplied with appropriate liquids and the liquids are maintained at optimum concentration and at optimum temperature in any approved manner which forms no part of this invention and is therefore not shown or described. The various liquids in compartments D, F and W recirculated past the films by means of a novel pump arrangement which will form the subject matter of a separate application. Contiguous with compartment W is a drying compartment which, except for being supplied with a drying medium instead of which a processing liquid, is identical with compartment W and is hence not shown or described. It is only necessary to point out that the hot air or other drying medium is blown downwardly on opposite sides of the film with a velocity sufficient to force all droplets of water off the vertical faces of the film. This limits the drying action of the air to the evaporation of the residual film moisture which is not bodily "scraped off" the sides of the film and shortens the drying time with commensurate increase in convenience and efficiency.

As shown in FIG. 3, an X-ray film 14 is loosely placed in a basket, or other supporting frame 15 which includes an upper cross bar the opposite ends 16 of which are adapted to rest in spaced notches R–1, R–2, R–3, etc.; D–1, D–2, etc; F–1, F–2, etc; and W–1, W–2, etc., in the upper edges of the sides of compartments R, D, F and W to suspend the films in the respective compartments. It will be understood that the upper edges of the sides of the drying compartment are also provided with similar notches. All the notches are uniformly spaced from each other, except that, for reasons hereinafter set forth, notches R–1, R–2, R–3, etc., of receiving compartment R are preferably closer together than the notches of the other compartments.

The mechanism which propels the film holders through the various compartments and which transfers the films from one compartment to another includes (1) a horizontal endless sprocket chain 18 which is driven by motor M and which runs over a sprocket wheel 19 on shaft S and over a sprocket wheel 20 on shaft S–1 to drive said shafts; (2) vertical endless chains 22 which run over upper sprocket wheels 30 which are mounted on opposite sides of the tank near the feed end thereof and over lower sprocket wheels 31 which are carried at the opposite ends of shaft S; and (3) vertical endless sprocket chains 24 which run over upper sprocket wheels 32 mounted on opposite ends of the tank near its delivery end and over lower sprocket wheels 33 which are carried by the opposite ends of shafts S–1. By this arrangement, sprocket chains 22 will run in the direction of arrows 37 and 38 and sprocket chains 24 will run in the direction of arrows 39 and 40, FIG. 4.

The machine also includes two rigid bars, or supporting members 41, which are disposed on opposite sides of the machine, and each of which carries long vertical fingers 44, 45, 46, 47, etc., and short fingers 48, 49 and 50. Bars 41 are connected, as at 54, to corresponding links of vertical sprocket chains 22 and 24 whereby, as these chains travel over their respective sprocket wheels, bars 41 and the fingers carried thereby will travel up and down, and laterally, relative to the sides of tank 10. It will be noted that the upper ends of all fingers are notched, as at 56, for engagement with the outer ends 16 of the film-holding baskets 15 in the manner hereinafter set forth. It will also be noted that, as the vertical sprocket chains travel around upper sprocket wheels 30 and 32 in the direction of arrows 37 and 39, bars 41 and the fingers carried thereby are moved to the right, and that, as the sprocket chains travel around lower sprocket wheels 31 and 32, the bars and the fingers are moved to the left as viewed in FIG. 4. The extent of this movement is dictated by the diameter of the sprocket wheels. The movement of bars 41 is a very important feature of the invention and will be further referred to.

Associated with vertical sprocket chains 22 are optional, auxiliary control sprocket wheels 60, one on each side of the tank. These sprocket wheels are used to modify the movement of bars 41 in the manner hereinafter set forth. At this point, it is only necessary to note that, when auxiliary sprocket wheels 60 are used, intermediate length fingers 72 and 73, etc., will be added to the portion of bars 41 which correspond to receiving compartments R, and that if sprocket wheels 60 are omitted, intermediate fingers 72, 73, etc., will be replaced by short fingers 48, 49 and 50.

The operation

If control sprocket wheels 60 are omitted, and if intermediate fingers 72, 73, etc., are replaced with short fingers like finger 48, the operation will be as follows:

Motor M is energized to actuate sprocket chains 22 and 24 and the baskets holding exposed films are placed in registering notches R-1, R-2, R-3, etc., in receiving compartment R. If we assume that the parts are in the position of FIG. 4, it will be seen that, as the sprocket chains move in the direction of arrows 37 and 39, bars 41 and the fingers carried thereby will, at first move upward along the opposite sides of the tank. This upward movement causes long fingers 44, 45, 46, 47 to engage the ends 16 of baskets 15, if any happen to be present, and to lift such baskets, as shown in FIG. 5, long before short fingers 48, 49 and 50 have reached the upper edges of the compartment. When the parts reach the position of FIG. 6, the long fingers will have raised the film-holding baskets or frames 15 high enough for the films 14 to clear the upper edges of partitions P, and the short fingers will have raised the ends 16 of the film-holding baskets 15 enough to clear the notch in which the ends 16 of the basket had been resting. As the parts begin to move past the position of FIG. 6 and toward the position of FIG. 7, sprocket chains 22 and 24 will move over sprocket wheels 30 and 32 and therefore bars 41 will be moved to the right as viewed in FIG. 4, a distance which is equal to the diameters of sprocket wheels 30 and 32 which in turn equal the distance between one notch R-1, or D-1 or F-1 and the next adjacent notch. When the parts reach the position of FIG. 7, the film-holding frames which were lifted, for example, out of notches R-1, D-1, F-1, etc., will be in registration with notches R-2, D-2, F-2, etc., so that, further downward movement of bars 41 will deposit the ends 16 of the film-holding frames 15 in notches R-2, D-2, F-2, etc. Then the sprocket chains move around lower sprocket wheels 31 and 33, bars 41 will be moved to the left a distance equal to the diameter of sprocket wheels 31 and 33. Since the diameters of all the sprocket wheels are equal, bars 41 will return to the position of FIG. 4 to begin a new cycle.

When the films are being developed, fixed and washed, they need to be spaced further apart than they need be when they are temporarily stored in receiving compartment R. This being the case, notches R-1, R-2, etc. of the compartment R are spaced apart a distance less than the distance between the notches in the other compartments so as to increase the storing capacity of compartment R. In practice, the distance between the notches of compartment R can be about one-half the distance between the other notches.

To produce this result, a pair of control sprocket wheels 60 are added and the portions of the bars 41 which register with compartment R will be provided with intermediate fingers 72, 73, which are long enough to engage the ends 16 of the film-holding baskets in compartment R, when the bars reach the half-way mark, or the position shown in FIG. 5. It will be noted that the periphery of sprocket wheel 60 is tangent to a vertical line passing through, or near, the center of sprocket wheels 30, 31. The exact position is not critical since it is only necessary that the size and location of sprocket wheels 60 be such as to displace bars 41, to the right as viewed in FIG. 4, before the bars reach upper sprocket wheels 30 thereby to reduce the net movement of bars 41 to the right as a result of their movement around said upper sprocket wheels. For example, if the diameter of sprocket wheels 30 is two inches, sprocket wheels 60 can be arranged to move bars 41 to the right a distance of one inch so that when the bars move around upper sprocket wheels 30, or to the position of FIG. 8, the net movement of the film-holding baskets carried by fingers 72, 73, etc., will be one inch. It will be noted that, since long fingers 44, 45, etc., engage the film-holding baskets when the parts are in the position of FIG. 4, and short fingers 48, 49, etc., engage the film-holding baskets when the parts are in the position of FIG. 6, control sprocket wheels 60 have no effect on the operation of the long and short fingers.

From the foregoing, it will be seen that we have devised a new method for continuously processing X-ray film, or the like, which method includes the step of simultaneously advancing one or more X-ray films, step-by-step, within one or more consecutive compartments and simultaneously transferring the X-ray films from one compartment to another. Optionally, the method also includes the additional step of depositing the films in a receiving compartment and in spacing the films in said receiving compartment more closely than they are spaced in the film treating compartments.

This method differs from other methods in that it is only necessary to deposit the films either in a pre-processing, or receiving, compartment, or in the first processing (the developing) compartment, without having to attach the film to any moving chains, or anything else.

It will also be noted that by our improved method and apparatus, the film conveying mechanism is wholly without the tank and that it does not obstruct the top of the tank so that the machine can be operated manually or automatically without in any way modifying the structure of the machine.

It will still further be noted that sprocket wheels can be added, or removed instantly and without any special tools or skill.

While, in the drawings, we show notches formed in the upper edges of the sides of the compartments, it is within the scope of the invention to form the notches in separate bars which are attached to the sides of the compartments. This is especially desirable in connection with receiving compartment R so that, if sprocket wheels 60 are removed, and fingers 72, 73 are replaced by short fingers 48, 49, the closely notched bar will be removed and a bar identical with the bars used in connection with the other compartments can be installed.

For the purposes of this application, "X-ray film" stands for any object which needs to be processed in one or more stages; "developing," "fixing" and "washing" stand for any other treatment; "tank" and "compartment" stand for any enclosure; "fingers" stand for any element which is engageable with the object to be processed; "frame" is used to designate any supporting member, and "conveyor" stands for any mechanism which will actuate the fingers simultaneously or successively to move the objects step by step within a compartment or from one compartment to another.

In conventional machines where the operating machinery is above the tank there is an element of danger in that while someone is using the tank the machinery may be accidentally set in motion. By the present invention the top of the tank is entirely unobstructed so that it is not only completely convenient for normal use, but is also completely safe because the moving parts are below the top of the tank and are close to the vertical sides thereof. In the present disclosure only the conveyor and the sprockets and other parts are visible, but in practice all of these parts can be enclosed so as to improve the appearance and so as to prevent a conveyor or the fingers from catching onto the clothing of the operator or of a passerby.

What we claim is:
1. An X-ray film processing machine including
   a tank having a bottom wall, end walls and side walls, the upper edges of said side walls being adapted to be straddled by film supporting frames to suspend said films in said tank, first upper and lower wheels on the opposite sides of said tank near the inlet end thereof, first endless conveyors on said first upper and lower wheels, first and second wheels on opposite sides of said tank near the discharge end thereof, second endless conveyors on said second upper and lower wheels, a first horizontal bar connected to corresponding selected points on the conveyors on one side of said tank, a second horizontal bar connected to identical points on the conveyors on the other side of said tank, relatively short upright fingers carried by said bars and engageable with the frames near the inlet end of said tank, relatively long fingers carried by said bars and engageable with the frames near the discharge end of said tank, means for driving all of said conveyors in the same direction and at the same speed to move said bars upwardly to engage first the long and then the short fingers with corresponding frames to lift the frames engaged by the long fingers high enough for the lower edges of the films to clear the top of said tank and to lift the frames engaged by the short fingers out of contact with the upper edges of said side walls; and actuating means for imparting a lateral motion to said short and long fingers.

2. A tank having side walls, the upper edges of which are adapted to be straddled by a plurality of article-carrying frames to suspend such articles in said tank, a pair of supporting members disposed on the outer sides of said side walls, actuating means for vertically reciprocating said members, a first transfer means carried by each of said supporting members, said first transfer means being engageable with one of said frames, upon partial upward movement of said members, to raise said frame to a predetermined vertical distance, a second transfer means also carried by each of said supporting members, said second transfer means being engageable with another of said frames upon further upward movement of said supporting members to raise said frame through a fraction of said predetermined distance, and means for laterally reciprocating said supporting members through a fixed distance.

3. The device defined in claim 2 wherein said supporting members are bars, wherein said first transfer means are relatively long fingers carried by said bars, and wherein said second transfer means are short fingers also carried by said bars.

4. In an X-ray film processing machine:

a tank, partition means dividing said tank into a receiving compartment and one adjacent processing compartment, the upper edges of the side walls of said receiving compartment having relatively closely spaced stations adapted to be engaged by an X-ray film supporting frame, the upper edges of said processing compartment having relatively widely spaced stations adapted to be engaged by said frame, supporting members on opposite sides of said tank, relatively short fingers carried by said supporting members in registration with the inlet end of said receiving compartment and engageable with said frame, relatively long fingers, also carried by said supporting members in registration with the delivery end of said receiving compartment and engageable with said frame, means inparting vertical movement to said supporting members to engage first said long, and then said short, fingers with said frame, means for laterally reciprocating said supporting members and said fingers through a fixed distance, and auxiliary means for partially laterally retracting said short fingers to limit the net movement of said short fingers to the distance between said relatively closely spaced stations.

5. The machine defined in claim 4 and a second short finger carried by said supports in registration with said processing compartment, and engageable with a frame straddling the upper edge thereof, only when the long finger registering with said processing compartment has reached its highest position whereby said frame and the film carried thereby are moved laterally of said processing compartment.

6. An X-ray film processing machine including:

a tank having side walls, partition means dividing said tank into a receiving compartment and one adjacent processing compartment, the upper edges of said side walls being adapted to be engaged by an X-ray film supporting frame to suspend such film in said tank, first upper and lower vertically aligned sprocket wheels on the opposite sides of said receiving compartment near the inlet end thereof, first endless sprocket chains on said first upper and lower sprocket wheels, second upper and lower vertically aligned sprocket wheels on opposite sides of the processing compartment at the discharge end thereof, second endless sprocket chains on said upper and lower sprocket wheels, a first bar connected to corresponding selected points on the chains on one side of such tank, a second bar connected to identical selected points on the chain on the other side of the tank, short and long upright fingers carried by said bars and engageable with said frames, means for driving all of said chains in the same direction and at the same speed to effect upward motion of said bars to engage said fingers with said frames to lift the latter out of engagement with the upper edges of said side walls and around the upper wheels to move said fingers and the frames carried thereby horizontally a distance which is dependent upon the wheel diameter, and control sprocket wheels intermediate said first upper and lower sprocket wheels and displaced laterally of the center line of said upper and lower sprocket wheels, said control sprocket wheels engageable with said first chains for moving said bar in a direction opposite to the movement thereof while passing over said upper sprocket wheels through a distance less than the diameter of said upper sprocket wheel to limit the net lateral movement of said bars and of the short fingers carried thereby relative to said receiving compartment,

References Cited by the Examiner

UNITED STATES PATENTS 2,823,595   2/1958   McFadden et al. _____ 95—89

FOREIGN PATENTS 83,439   5/1957   Denmark.

NORTON ANSHER, *Primary Examiner.*

C. B. PRICE, *Assistant Examiner.*